United States Patent [19]

Dinulescu

[11] 4,265,732

[45] May 5, 1981

[54] PROCESS AND APPARATUS FOR ENDOTHERMIC REACTIONS

[75] Inventor: Mircea Dinulescu, Gouda, Netherlands

[73] Assignee: Kinetics Technology Intl. B.V., Zoetermeer, Netherlands

[21] Appl. No.: 922,168

[22] Filed: Jul. 3, 1978

[30] Foreign Application Priority Data

Jul. 5, 1977 [GB] United Kingdom ............... 28049/77

[51] Int. Cl.$^3$ ......................... C10G 9/00; C10G 15/00
[52] U.S. Cl. .................................... 208/106; 208/128; 208/130; 585/650; 60/39.02
[58] Field of Search ................... 60/39.02, 39.41, 315; 208/106, 132; 196/46; 585/650

[56] References Cited

U.S. PATENT DOCUMENTS

| 1,371,268 | 3/1921 | Snelling | 208/106 |
|---|---|---|---|
| 2,814,551 | 11/1957 | Broeze et al. | 208/106 |
| 3,393,668 | 7/1968 | Milgram | 60/315 |

Primary Examiner—Louis J. Casaregola
Attorney, Agent, or Firm—Haseltine and Lake

[57] ABSTRACT

The invention is a method of handling the enthalpy of reaction of fast homogeneous gas-phase chemical reactions, by using mechanical energy in the form of work performed by moving surfaces in contact with the reactants, for adding energy to or removing energy from the gaseous reactants. Transfer of energy is obtained by adiabatic compression or expansion of the gas, or by adiabatic dissipation of mechanical energy into heat. The invention further relates to an apparatus for carrying out fast homogeneous gas phase chemical reactions wherein the said principles are applied in the reactor and to a process for cracking hydrocarbons wherein the said principle is applied in the reactor.

11 Claims, 17 Drawing Figures

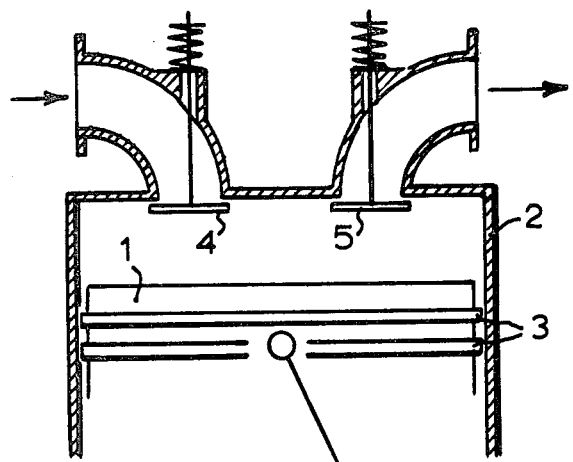
FIG. 1a
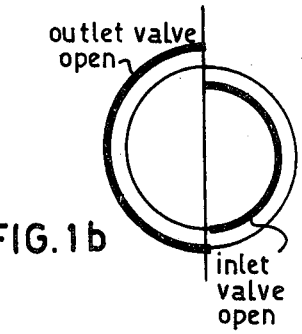
FIG. 1b
FIG. 1c
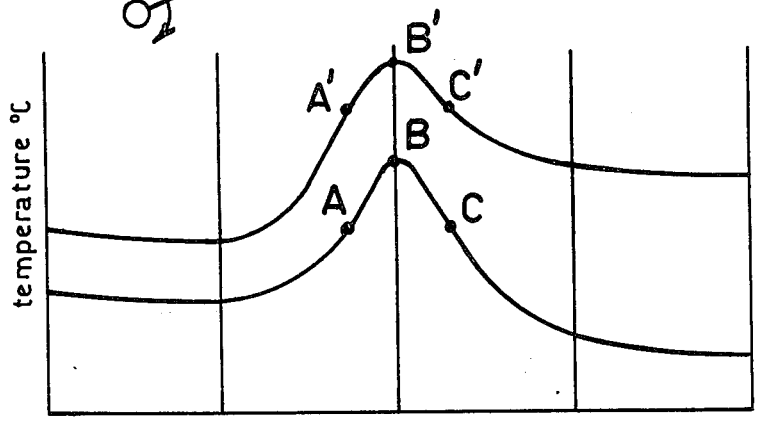
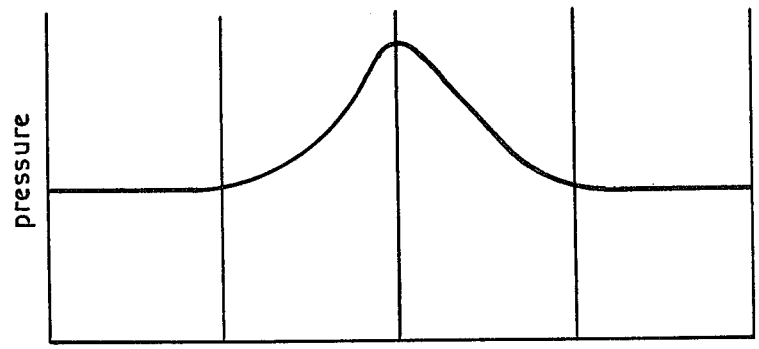

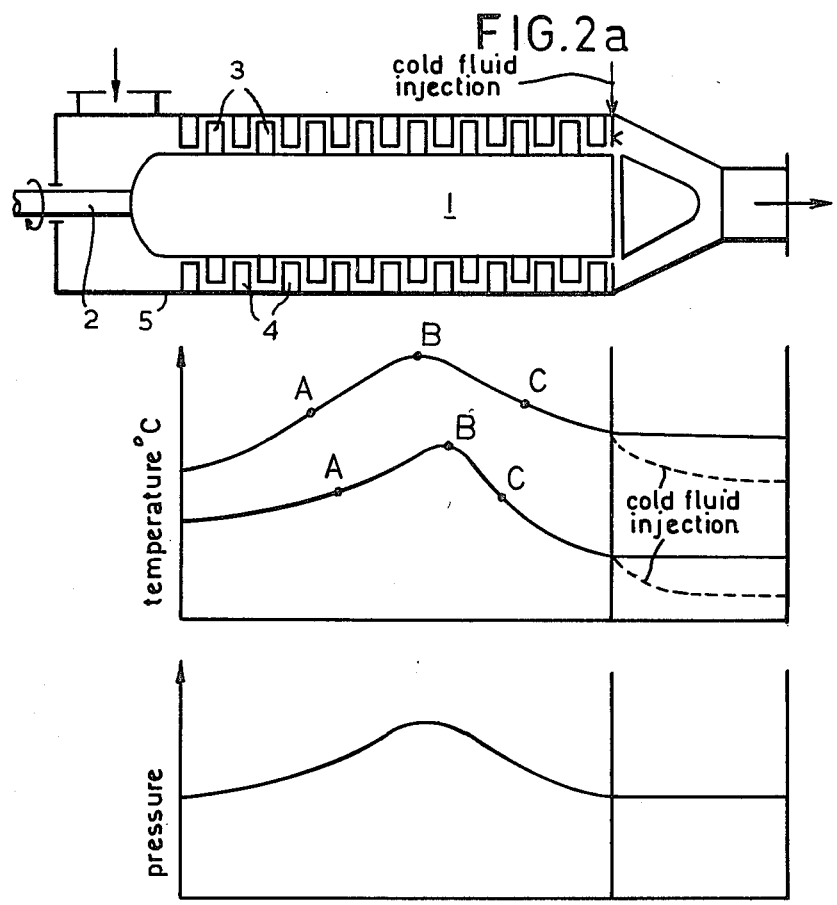
FIG. 2a
FIG. 2b
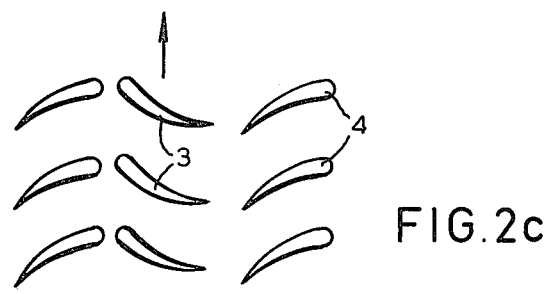
FIG. 2c

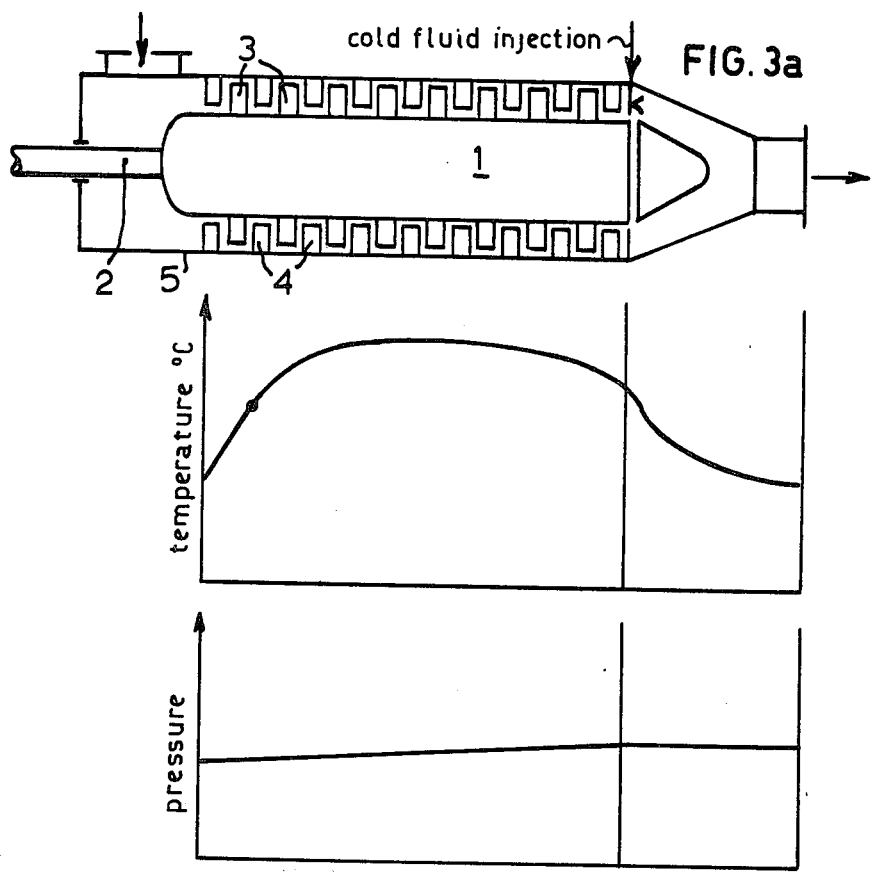
FIG. 3a
FIG. 3b
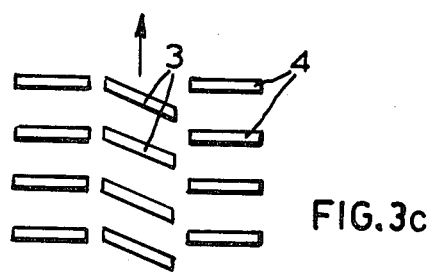
FIG. 3c

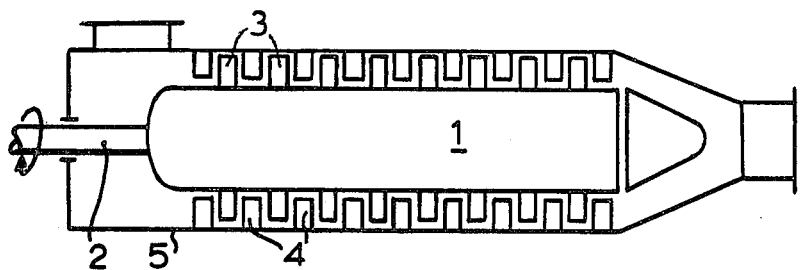
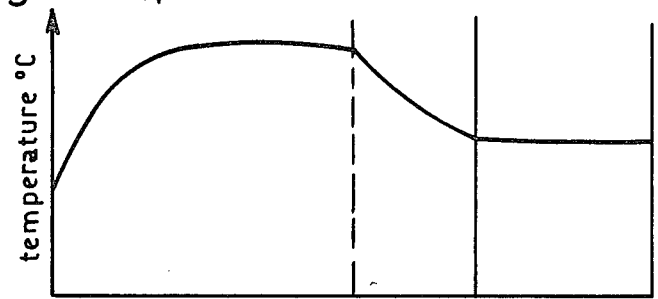
FIG. 4
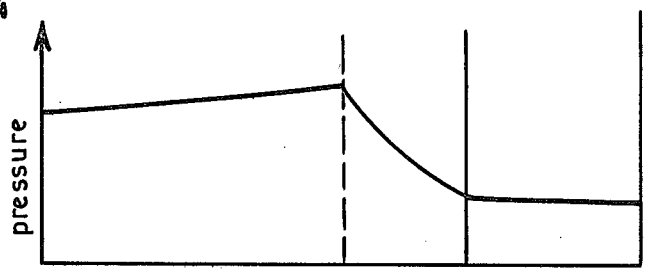
FIG. 6
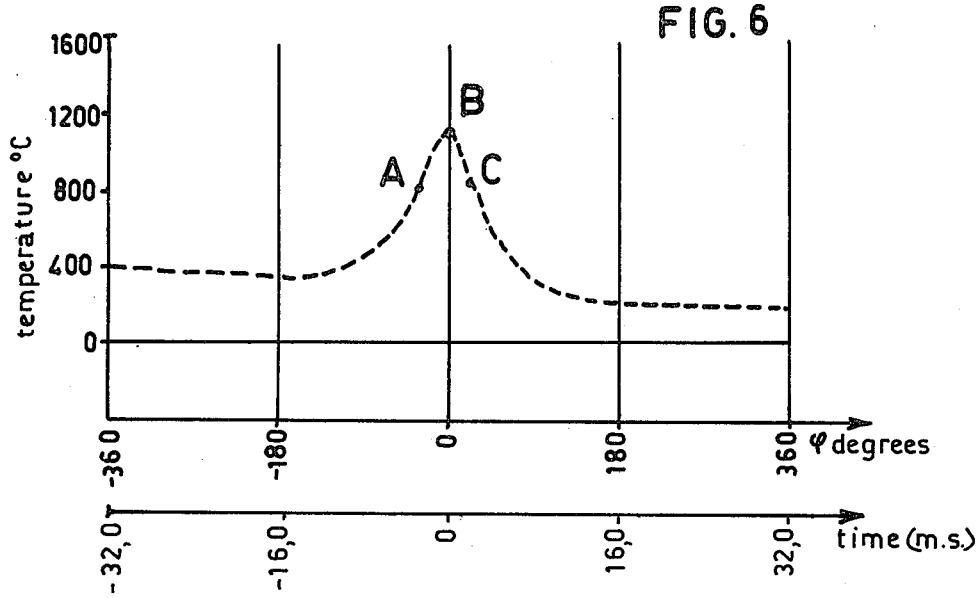

PROCESS AND APPARATUS FOR ENDOTHERMIC REACTIONS

The homogeneous chemical reactions in gas phase represent a large portion of the class of chemical reactions applied in industry. The temperature of these reactions ranges from moderate (100°–200° C.) to very high (2000°–2500° C.) while the pressure covers a range from advanced vacuum to thousands of bars.

The heat effect of these reactions is at the present time handled by three distinct methods:

(a) by heat transfer from a solid surface in contact with the reactants. The solid surface can be a continuous surface separating the reactants from the cooling or heating medium (fired and non-fired heat exchangers) or can be in the form of solid particles which are cooled or heated up prior to being brought in contact with the reactants (fluidized bed, regenerative reactor)

(b) by direct contact. The reactants can be brought in contact with a hotter or colder gas or with a liquid accompanied or not by vaporization or condensation.

(c) by electrical arc. The high velocity charged particles moving in an electrical field transfer energy to the gas molecules by collision. The gas enthalpy can be increased only.

It is usually desirable to carry out the reaction in a homogeneous field of temperature, pressure, and concentration of the chemical components; generally any departure from homogeneity has a detrimental effect on the products of reaction. In the case of gas phase reactions the condition of homogeneous concentration field results from the condition of homogeneity of pressure and temperature provided that the initial concentraton field is homogeneous. Of these two parameters the pressure can be kept homogeneous easily while the temperature presents an inhomogeneous field due to the large amount of heat to be transferred to or from the reactants.

It is therefore the temperature distribution in the reaction zone which is responsible for the performance of a chemical reactor. The methods (a), (b) and (c) above of handling the heat effect of the reaction present a certain degree of inhomogeneity in the temperature field which is more significant for shorter reaction times and higher heat effects.

When the reaction time is long (e.g. more than 1 second) the heat transport inside the gas volume can be achieved much faster than the reaction time (e.g. in flow reactors with turbulent flow or in well mixed batch reactors) resulting in a practically homogeneous temperature field. However in the case of fast chemical reactions (reaction time of 0.0001 to 0.1 seconds) the time required for the transport of energy by using the methods (a), (b), or (c) above can be much higher than the time of reaction resulting in a highly inhomogeneous temperature field.

Method (a) above, which finds the largest practical application, creates an inhomogeneous temperature field due to the temperature difference between the solid surface and the reacting gas. Due to this difference in temperature the rate of reaction (usually increasing very fast with the temperature) is higher in the hotter gas particles resulting in an inhomogeneous concentration field.

Method (b) above creates an inhomogeneous concentration field not only due to heat transfer as explained above but also due to the process of mixing of the reactants with a fluid of different composition.

Method (c) above, while providing the advantage of transfering heat directly in the gas volume by the collision of the fast moving charged particles with the gas molecules, the flux of charged particles is not uniformly distributed over the gas volume thus creating a non-uniform dissipation of energy and therefore an inhomogeneous temperature and concentration field.

The invention now relates to a method of handling the enthalpy of reaction of fast homogeneous gas phase chemical reactions.

According to the present invention a much more homogeneous temperature field can be achieved, while carrying out the reaction at very short residence time (0.0001 to 0.1 s.) by using mechanical energy in the form of work performed by moving surfaces in contact with the reactants supplied to the reactor for endothermic reactions and supplied by the reactor to the surroundings for exothermic reactions.

There are two main thermodynamic processes of transfer of energy in the form of mechanical work which can be profitably used for the above mentioned purpose: the adiabatic compression or expansion of the gas and the adiabatic dissipation of mechanical energy into heat. Both of these processes of energy transfer take place by work done on or by the moving surfaces in contact with the reacting gas. The adiabatic compression and expansion of the gas can be achieved with low dissipation in a very short time due to the very short time required by the pressure differences to level out in the gas volume. For the exothermic reactions the work performed on the surroundings during the adiabatic expansion results in an internal energy decrease which compensates for the heat evolved as a result of the reaction, allowing the control of the reaction at the desired level of temperature. For the endothermic reactions the adiabatic compression results in an internal energy increase which compensates for the heat absorbed by the reaction. The level of turbulence in the reacting mixture can be kept low resulting in low dissipation of energy and slow heat transfer between the gas and the walls. The reaction can be carried out at a much higher temperature than the enclosing cooled walls, the region of non-homogeneous temperature field being restricted to a thin thermal boundary layer along the walls. In the case of the most reactions carried out at an advanced conversion level of interest for industrial application the enthalpy of reaction is higher than the work which the gas can exchange by expansion or compression. In such cases the temperature of the reaction can be controlled by diluting the reactants in a gas (e.g. $H_2$, He, Ar, $N_2$, $H_2O$) which does not react chemically in the condition of the reaction. The mechanical work exchanged is a quantity proportional to the total amount of gas (diluant + reactants) while the enthalpy of reaction is proportional to the amount of reactants. By changing the diluant/reactants ratio the mechanical work can be balanced against the enthalpy of reaction in order to keep the reaction under control.

The dissipation of mechanical energy into heat can be used only for endothermic reactions as the only possible direction of exchange of work is from the surroundings to the system in which the dissipation takes place. The dissipation is achieved by creating a small scale high intensity turbulent field in the reacting gas volume as a result of the motion of solid surfaces inside the gas volume. During this motion the surfaces encounter a strong aerodynamical resistance. The form of the surface must be such that the shear friction force is much lower than the drag force so that the major part of the mechanical work performed by the solid surface is converted into kinetic energy of the gas and this kinetic energy is further dissipated into heat into small vortices distributed homogeneously in the gas volume. By cooling the surface the reaction can be carried out at a temperature much higher than that of the enclosing surfaces.

Based on the above methods of carrying out the homogeneous gas phase chemical reactions the invention provides new types of chemical reactors using mechanical energy in the form of work performed by moving surfaces in contact with the reactants as a source of enthalpy of reaction whose principal advantages consist in processing large quantities of gas in a continuous manner at a very short reaction time (0.0001 S to 0.1 S) in a homogeneous temperature field.

The invention further provides the processes in which these new reactor types can be used for executing the chemical reactions at an industrial scale.

Three types of chemical reactors are presented: positive displacement machines, similar to conventional 4-stroke engines, compressor/turbine axial type reactors, energy dissipator axial type reactors. These three reactor types can be used for deriving a few processes.

BRIEF DESCRIPTION OF THE DRAWINGS

FIG. 1a is a sectional view of a reciprocating type reactor.

FIG. 1b is a sectional view of the inlet and outlet valves of the reactor in FIG. 1a.

FIG. 1c is a gas temperature profile along the cycle of the reactor in FIG. 1a.

FIG. 2a is an elevational view of a compressor/turbine axial type reactor.

FIG. 2b shows the temperature and pressure profiles for the reactor in FIG. 2a.

FIG. 2c is a sectional view of the blades of the reactor in FIG. 2a.

FIG. 3a is an elevational view of an energy dissipator axial type reactor.

FIG. 3b. shows the temperature and pressure profiles for the reactor of FIG. 3a when the reaction is terminated by injection of a cold gas or liquid.

FIG. 3c is a sectional view of the blades of the reactor in FIG. 3a.

FIG. 4 shows the temperature and pressure profiles for the reactor of FIG. 3a when the reaction is terminated by turbine stages.

FIG. 6 shows the temperature profile for a cycle of the reaction carried out according to FIG. 5 and Example I.

FIG. 8b is a sectional view of the blades of the reactor in FIG. 8a.

RECIPROCATING TYPE REACTOR (Positive Displacement machine)

Figure 5:
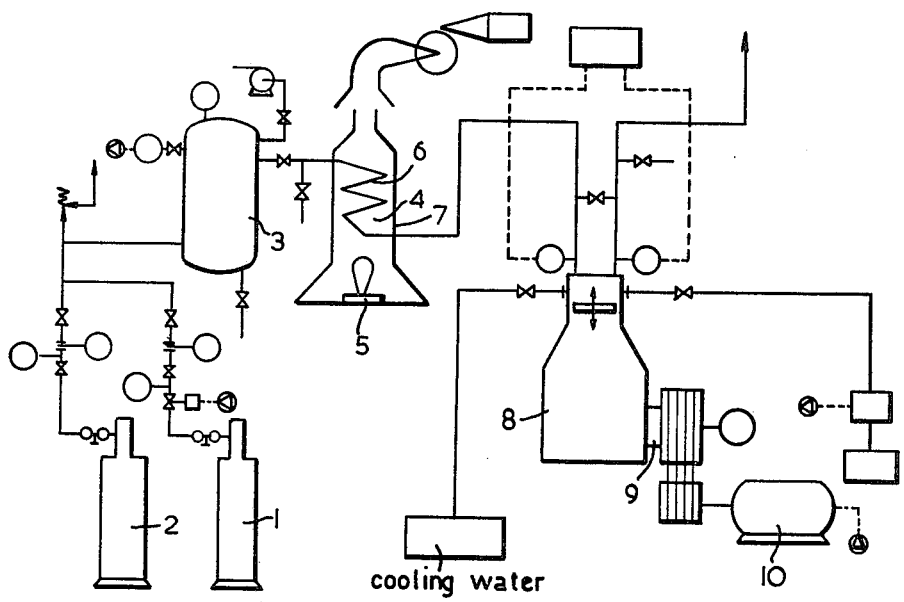
FIG. 5 is a schematic flow chart for thermal cracking of propane diluted with nitrogen.

The reciprocating type reactor is a batch reactor in which a volume of gas is admitted into the reactor, is exposed to the reaction cycle, and is then evacuated from the reactor, the cycle being repeated with another volume of gas, the reactor producing a continuous stream of reaction products The reactor consists of a piston (1) (FIG. 1a) moving into a cylinder (2) the sealing between the piston and the cylinder being ensured by the sealing rings (3). The shaft (7) which rotates at a constant angular speed is connected with the piston (1) by the connecting rod (6). The inlet valve (4) and the outlet valve (5) operate in a sequence similar to that of a 4-stroke reciprocating engine (FIG. 1b). The cylinder can be cooled with cooling water or other liquids if the reaction temperature is too high. The lubricant used must be selected in such a way that it does not react chemically with or contaminate the products of reaction. The design of the reactor is of a conventional type, based on the available technological skill in the field of 4-stroke reciprocating engines.

FIG. 1c indicates the gas temperature profile along the cycle. The gas, mixed with a diluant if required, is preheated before being admitted into the reactor from the feed supply line at a temperature at which the reaction rate is negligible. During the compression the pressure and the temperature increase. At the point A (A') the temperature is high enough to initiate the reaction. The reaction takes place in the region ABC (A'B'C') being frozen by the gas expansion after point C (C') accompanied by a temperature decrease. The gas is evacuated to the product line and a new cycle starts. In the case of endothermic reactions (ABC) the temperature at the outlet is lower than the inlet temperature due to the heat absorbed by the reaction and to the heat losses. In the case of exothermic reactions the outlet temperature is higher than the inlet temperature if the heat of reaction is larger than the heat losses.

COMPRESSOR/TURBINE AXIAL TYPE REACTOR

This reactor type is a flow reactor in which the temperature and the pressure of the gas changes as a result of the exchange of mechanical work while flowing in a continuous manner through the reactor stages designed as compressor and/or reactor stages in such a way to obtain the desired temperature profile. The reactor (FIG. 2a) consists of a rotor (1) transferring mechanical work to/from the surroundings via a shaft (2). The rotor (1) is provided with the rotary blades (3) which rotate between the stationary blades (4) fixed on the casing 5. The design of the reactor is of a conventional type. The form of the stationary blades and of the rotary blades shall be selected in such a way that the reactor provides the desired energy transfer profile in the form of work of compression or expansion to suit the reaction at hand. The compression and/or expansion are achieved with high hydraulic efficiency. The advantages of this reactor type consist in the possibility of designing the reactor for an arbitrary energy input (in the form of work of compression or expansion) profile and the ability of processing large quantities of gas in a continuous manner.

The reactant diluted if required is preheated at a temperature at which the reaction rate is negligible, is admitted into the reactor and, is circulated through the stationary and rotary blades following the desired temperature and pressure profile (FIG. 2b). The reaction takes place in the region ABC (A'B'C') being quenched by the further expansion of the gas. Another possibility of quenching the reaction in a short time consists in injecting a cold fluid (e.g. water) at the reactor outlet or between the stages.

ENERGY DISSIPATOR AXIAL TYPE REACTOR

This reactor type can be used only for endothermic reactions. The reactor (FIG. 3a and 4) is of a construction similar to that indicated in FIG. 2a with the exception of the form of the blades (FIG. 3c) which is designed in such a way that the major part of the shaft work is dissipated into heat. The blades can be e.g. straight and of a rectangular cross section (FIG. 3a) with the stationary blades (4) placed in the axial direction and with the rotary blades (3) slightly inclined so that a small compression can be achieved in order to circulate the gas through the reactor without an appreciable pressure drop or even with a slight pressure increase. According to this geometry of the blades, given here as an example only without excluding the other different shapes which could be used for dissipating the shaft work into heat, the gas is imprated a high tangential velocity this kinetic energy being dissipated into heat in the stationary blades by changing in an abrupt way the direction of flow from tangential to axial.

The termination of the reaction can be achieved by two distinct methods. As a first method the dissipating stages can be followed by turbine stages (FIG. 4) which execute a fast expansion of the gas with a high hydraulic efficiency accompanied by a temperature drop. As a second method (FIG. 3a) a cold gas or a liquid can be injected after the last stage of the reactor or between the last stages, the fast cooling of the reaction products being achieved by transferring sensible heat and/or latent heat to the injected fluid.

The present invention is particularly suitable for endothermic noncatalytic conversion and especially for the preparation of olefins from a large variety of starting materials, ranging from ethane to gasoil, only the composition of the effluent stream coming from the reactor varying with the nature of the starting material. Ethane provides at usual degrees of conversion of 55–65% e.g. only 5% of heavier by-products, while from naphtha besides ethylene, rather large amounts of butylenes and butadiene and further propylene, gasoline and some fuel oil are obtained. All these starting materials can also be used with the process according to the invention.

EXAMPLE I

Tests were carried out for the thermal cracking of propane diluted in nitrogen, using an installation as shown schematically in FIG. 5. In this installation a stream of high purity propane (99.9%) obtained from a tank (1) is mixed with a stream of pure nitrogen (maximum impurities 50 ppm) coming from the tank (2). The molar ratio of propane to nitrogen in the mixture is adjusted by varying independently the flow rate of both streams. The mixture so formed is circulated through the drum (3), which serves the purpose of damping the aerodynamical oscillation of the system. The mixture from the drum (3) is preheated in the preheater (4) comprising a propane burner (5) and a heating coil (6) in a housing (7). The propane fuel for the burner is obtained from a source of propane not shown. The mixture, preheated to a temperature at which the reaction rate is negligible, passes to the reactor (8) consisting of a CFR type variable compression ratio single cylinder engine designed for testing the knocking properties of fuels, which is used now as a reciprocating type reactor as described above. The engine cylinder is cooled with cooling water kept at an average temperature of 50° C. The engine shaft (9) is driven by means of an electromotor (10) at a speed of 1870 rpm. The temperature profile followed by the gas during a cycle can be calculated from the mass and energy balance along the cycle and is indicated for run nr. 1 (see Table 1) in FIG. 6. The reaction starts at point A before the top dead center and ends about 0.0045 s later (point C). The reaction product is evacuated to the product line from which a sample can be extracted and cooled for analysis. The results of the analysis made for the operating conditions indicated in Table 1 are given in Table 2.

TABLE 1

| | | | ENGINE | | | | | |
|---|---|---|---|---|---|---|---|---|
| Run nr. | $N_2$ flow Kg/hr | $C_3H_8$ flow Kg/hr | Temp. Inlet °C. | Outlet °C. | Compression | Inlet pressure bar abs. | Peak total pressure bar abs. | Speed rpm |
| 1 | 18.7 | 0.174 | 408 | 196 | 15 | 1.4 | 36.7 | 1870 |
| 2 | 17.8 | 0.176 | 386 | 192 | 15 | 1.4 | 34.2 | 1870 |
| 3 | 20.2 | 0.173 | 362 | 182 | 15 | 1.3 | 37.9 | 1870 |
| 4 | 20.8 | 0.172 | 340 | 176 | 15 | 1.4 | 39.1 | 1870 |
| 5 | 20.5 | 0.171 | 316 | 170 | 15 | 1.4 | 37.9 | 1870 |

TABLE 2

| Run nr. | | | 1 | 2 | 3 | 4 | 5 |
|---|---|---|---|---|---|---|---|
| Conversion | | | 83.8% | 77.1% | 76.6% | 68.5% | 55.6% |
| Component | MW | MOL. % | MOL. % | MOL. % | MOL. % | MOL. % | |
| Hydrogen | $H_2$ | 2.016 | 26.164 | 24.142 | 24.457 | 22.215 | 20.071 |
| Carbon monoxide | CO | 28.010 | 0.022 | 0.075 | 0.024 | 0.020 | 0.027 |
| Carbon dioxide | $CO_2$ | 44.010 | 0.127 | 0.031 | 0.976 | 0.047 | 0.889 |
| Methane | $CH_4$ | 16.042 | 20.367 | 19.121 | 18.294 | 17.073 | 14.222 |
| Ethane | $C_2H_6$ | 30.068 | 1.791 | 2.508 | 2.846 | 3.214 | 3.111 |
| Ethylene | $C_2H_4$ | 28.052 | 31.036 | 30.405 | 29.677 | 28.120 | 23.111 |
| Acetylene | $C_2H_2$ | 26.036 | 7.013 | 4.953 | 4.472 | 3.348 | 2.133 |
| Propane | $C_3H_8$ | 44.094 | 7.685 | 11.660 | 12.033 | 17.408 | 27.289 |
| Propylene | $C_3H_6$ | 42.078 | 3.730 | 5.078 | 5.204 | 6.561 | 7.556 |

TABLE 2-continued

| Run nr. | | | 1 | 2 | 3 | 4 | 5 |
|---|---|---|---|---|---|---|---|
| Conversion | | | 83.8% | 77.1% | 76.6% | 68.5% | 55.6% |
| Component | MW | MOL. % | MOL. % | MOL. % | MOL. % | MOL. % | |
| Propadiene | $C_3H_4$ | 40.062 | 0.366 | 0.357 | 0.350 | 0.301 | 0.302 |
| i-butane | $C_4H_{10}$ | 58.120 | 0.015 | — | 0.016 | 0.027 | — |
| n-butane | $C_4H_{10}$ | 58.120 | 0.024 | — | 0.016 | 0.027 | — |
| 1-butene | $C_4H_8$ | 56.104 | 0.216 | 0.364 | 0.406 | 0.502 | 0.658 |
| trans-2-butene | $C_4H_8$ | 56.104 | 0.011 | 0.030 | 0.041 | 0.040 | — |
| cis-2-butene | $C_4H_8$ | 56.104 | 0.027 | 0.023 | 0.049 | 0.040 | — |
| 1,3-butadiene | $C_4H_6$ | 54.088 | 0.642 | 0.627 | 0.545 | 0.536 | 0.427 |
| Methylacetylene | $C_3H_4$ | 40.062 | 0.709 | 0.627 | 0.594 | 0.522 | 0.276 |
| i-pentane | $C_5H_{12}$ | 72.146 | 0.009 | — | — | — | 0.072 |
| n-pentane | $C_5H_{12}$ | 72.146 | 0.046 | — | — | — | — |
| Total | | | 100.000 | 100.000 | 100.000 | 100.000 | 100.000 |

From these data it appears that, using a reciprocating type reactor, indeed a high conversion at high temperatures with short residence time can be obtained. However, the cracking of propane carried out in these conditions is not economically attractive, while this process can be attractive for other reactions. The experiments reported above are carried out as a simulation of the process described in the following example, which represents one of the most attractive practical applications of the present invention.

EXAMPLE II

Figure 7:
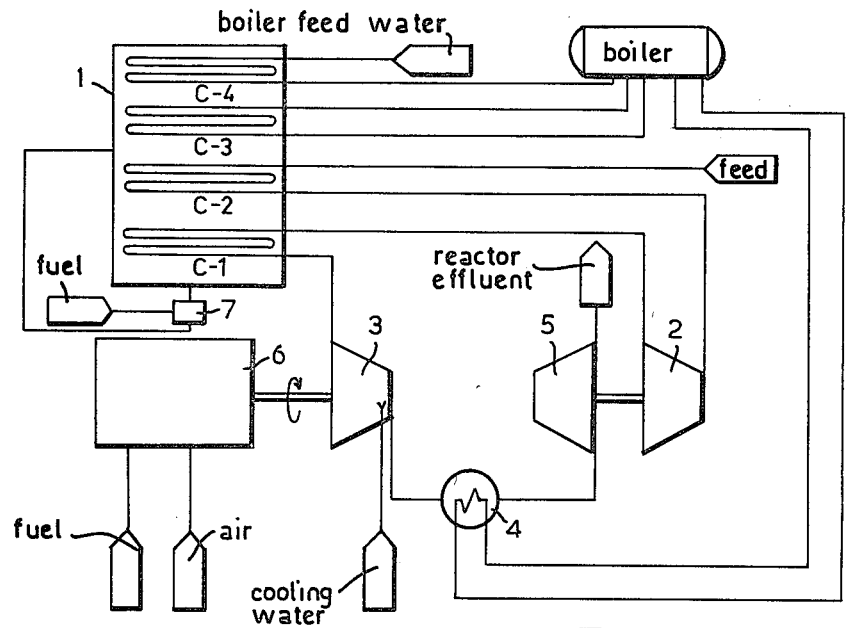
FIG. 7 is a schematic flow chart for thermal cracking of propane according to Example II.
Figure 8A:
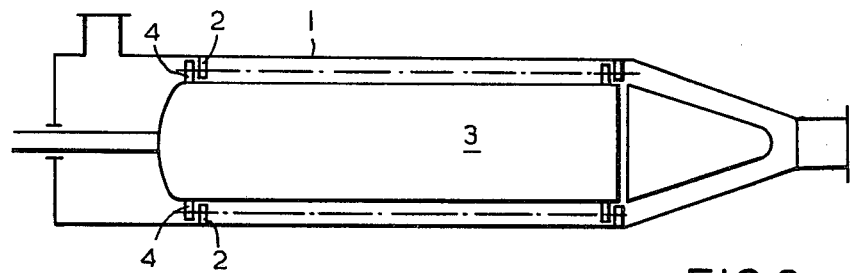
FIG. 8a is an elevational view of an energy dissipator axial type reactor used in Example II.
Figure 8B:
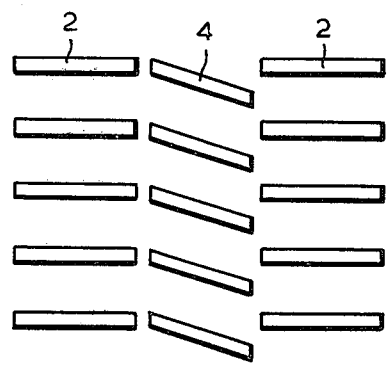

A reactor system represented schematically in FIG. 7 is used for cracking a large throughput of propane in the conditions simulated on the installation described in example I. An energy dissipator axial type reactor is used as shown schematically in FIG. 8. It comprises a housing (1) provided with a series of 44 stages of straight stationary blades (2) placed in the axial direction each stage containing 100 blades. Within the housing is rotably mounted a rotor of 1.4 m dia comprising a rotor body (3) provided with 43 stages of straight rotary blades (4) which are slightly inclined from the axial direction in order to provide a slight compression of the reacting gas each stage containing 100 blades. The reactor is designed for processing 2.8 kg/s propane. The fact that no coke formation could be detected during the simulation is an indication that the low reaction time and the vacuum condition suppress the coke formation and therefore no dilution steam is required. At the reactor inlet the open area is 0.115 m² with a blade height of 26 mm and at the reactor outlet the open area is 0.082 m² with a blade height of 19 mm. The length of the apparatus is 2.58 m.

Figure 9:
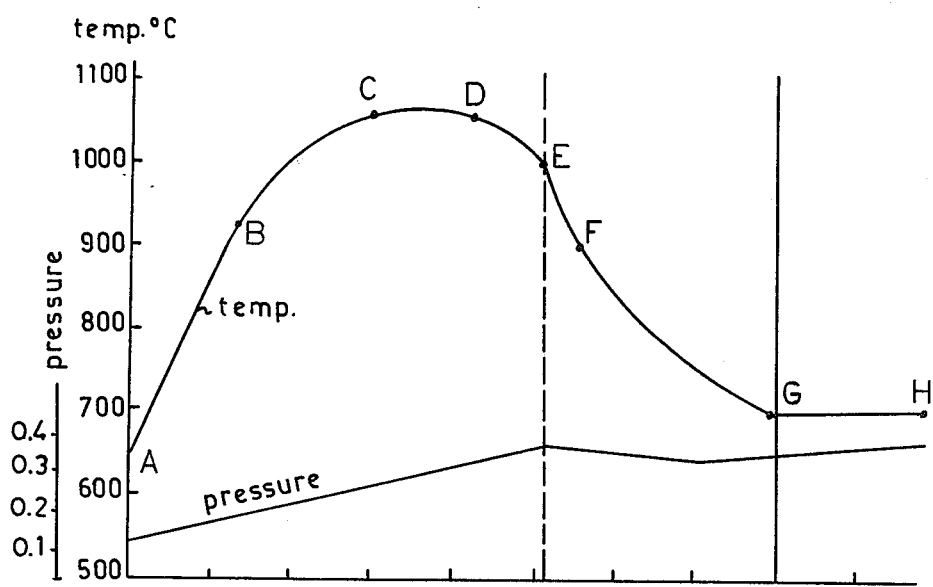
FIG. 9 shows the temperature and pressure profile for the reaction carried out according to Example II.

The temperature and pressure profile followed by the reactants is indicated in FIG. 9. The gas flows in the axial direction with a velocity of 500 m/s while the tangential velocity of the rotary blades is 450 m/s. The energy dissipated per stage is constant and amounts to 280 kW, the total shaft power absorbed by the reactor being 12030 kW at a rotor speed of 6000 rpm. The propane feed enters the reactor at 650° C. and 0.1 bar abs. (A). In the region A-B the reaction rate is low and the energy input results in temperature increase. In the region B-C reaction rate increases, and the slope decreases due to the increased enthalpy of reaction. In the region C-D the enthalpy of reaction is approximately equal to the energy input resulting in an almost constant temperature profile. In the region D-E the number of endothermal reactions taking place increase due to the increase in the concentration of the products of reaction and therefore the enthalpy of reaction is higher than the energy input resulting in a decrease in temperature. At point E corresponding to the reactor blading outlet the quenching water is injected resulting in a sharp temperature decrease E-F. At the point F the reaction is practically stopped, the cooling continuing in the region F-G. The gas is evacuated from the reactor at 700° C. and 0.4 bar abs. (H) into a conventional shell and tube heat exchanger where the gas is further quenched to 320° C.

This reactor is integrated in an economical manner into the scheme indicated in FIG. 7. The propane feed at 100° C. and 20 bar abs. is preheated to 600° C. in the coil C-2 of a conventional convection section (1) and is then expanded into the feed expander (2) to 0.3 bar abs. and 440° C. This stream is further preheated to 640° C. in the coil C-1 and introduced into the reactor (3) (presented schematically in FIG. 8) at a pressure of 0.1 bar abs. The products of reaction leave the reactor at 700° C. and 0.4 bar abs. being further cooled into the shell side of the quench cooler (4). The effluent of the quench cooler is compressed from 0.3 bar abs. and 320° C. to 1.1 bar abs. and 456° C. by the compressor (5) driven by the feed expander (2). The reactor effluent is further sent to the conventional separation unit of the plant.

The reactor is driven by a conventional gas turbine (6). Part of the gas turbine exhaust gas rich in oxygen is preheated to 1200° C. in the burner (7) and used for high temperature energy recovery in the convection section (1). The remainder of the gas turbine exhaust gas is used for the low temperature heat recovery in the convection section (1). Both the gas turbine and the burner use a conventional fossil fuel (.e.g. natural gas in which case the combined fuel consumption is 3300 kg/hr). 28 000 kg/hr of high pressure steam (82 bar abs., 295° C.) is generated by cooling down the exhaust gases to 230° C. in the convection section (1) and by cooling the reactor effluent in the quench cooler (4).

The reaction takes place in the region BCDEF (FIG. 9) in 0.0045 s. The temperature and pressure profiles are similar with those obtained during the simulation explained under example I (FIG. 6). Therefor it is expected to obtain similar yields indicated in Table 3 for 83.2% propane conversion. In Table 3 the yields obtained from the conventional cracking furnaces is indicated allowing an evaluation of the increase in performance brought about by the new reactor type. It can be seen that the effluent of the new reactor carried out under the conditions specific to the present invention is more rich in acetylene and ethylene compared with the effluent of a conventional cracking furnace using propane as a feedstock.

TABLE 3

|  | Effluent of a conventional cracking furnace | Effluent of the energy dissipator axial type reactor |
|---|---|---|
| $H_2$ | 1.3. wt. % | 2.5 wt. % |
| $CH_4$ | 22.2 | 15.7 |
| $C_2H_2$ | 0.7 | 8.7 |
| $C_2H_4$ | 32.0 | 41.8 |
| $C_2H_6$ | 4.4 | 2.7 |
| $C_3H_6$ | 14.1 | 9.7 |
| $C_3H_8$ | 16.2 | 16.2 |
| $C_4$ | 3.0 | 2.5 |
| $C_{5+}$ | 6.1 | 0.2 |
| TOTAL | 100.0 | 100.0 |

EXAMPLE III

Figure 10:
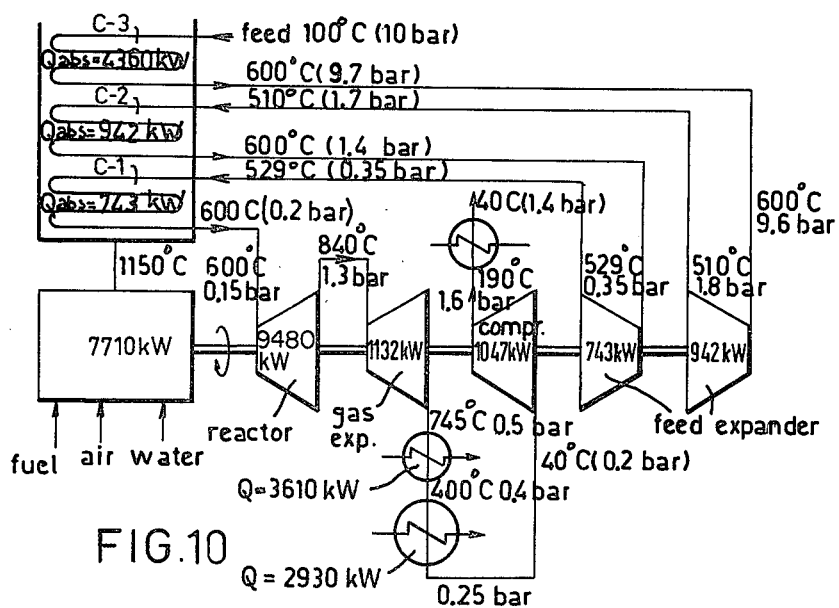
FIG. 10 is a schematic view of the reactor system used for Example III.

Ethane, obtained as a by-product in a refinary and having a temperature of 100° C. and being under a pressure of 10 bars is introduced into a reactor system as schematically shown in FIG. 10, where it is first preheated in an usual manner.

In this way a gas stream is obtained which passes to the reactor, said gas stream having a temperature of about 600° C. and a pressure of about 0.2 bars abs.

The reactor absorbs 9480 kW shaft power; said power is on the one side supplied by a driving apparatus which supplies 7710 kW and on the other hand by two expansion turbines for the feed also coupled to the reactor which respectively supply 942 kW and 743 kW and by the combination of an expansion turbine for the effluent and a product compressor, which together supply 85 kW (1132 kW which are obtained in the expansion turbine for effluent minus 1047 kW which are used in the product compressor).

The driving apparatus supplying 7710 kW is preferably a gas turbine; such a turbine provides a good yield because of direct coupling to the reactor while the flue gases can serve for pre-heating the ethane. The compressor axial type turbine reactor such as applied here is a 30-stage-compressor having 75–85 blades per stage, which is rotating with about 6000 rpm and supplies an axial gas velocity of 100 m/sec.

This compressor has a total length of about 2.4 m (length per stage 80 mm), so that the residence time is 2.4/100=0.024 s.

In this system the expansion turbine stages which follow the compression stages in the reactor give a rapid cooling of the reactor effluent on the one side and by the work recovered make possible a restriction of the total amount of heat which must be introduced in the gas turbine.

What is claimed is:

1. A process for cracking hydrocarbons which comprises passing a preheated gaseous phase containing hydrocarbons into an axial type reactor having internal rotating blades, utilizing mechanical energy in the form of work performed by said rotating blades on said gaseous phase to provide heat for cracking said hydrocarbons, followed by rapidly cooling said gaseous phase containing cracked hydrocarbons.

2. The process of claim 1, wherein the gaseous phase is adiabatically compressed by the rotating blades.

3. The process of claim 1, wherein the mechanical energy is adiabatically dissipated into heat by the rotating blades.

4. The process of claim 2, wherein the rapid cooling is effected by injecting a cooling fluid into the reactor downstream of the blades.

5. The process of claim 3, wherein the rapid cooling is effected by injecting a cooling fluid into the reactor downstream of the blades.

6. The process of claim 2, wherein the rapid cooling is effected by adiabatic expansion of the gaseous phase.

7. The process of claim 3, wherein the rapid cooling is effected by adiabatic expansion of the gaseous phase.

8. The process of claim 6, wherein additional cooling is provided by injecting a cooling fluid into the reactor.

9. The process of claim 5 wherein the gaseous phase contains propane.

10. The process of claim 9, wherein the propane is diluted with nitrogen.

11. The process of claim 5, wherein the gaseous phase contains ethane.

* * * * *